Sept. 20, 1960 A. J. GAREY 2,953,403
ADJUSTABLE DRIVE COUPLING FOR PUMP SHAFTS
Filed Jan. 7, 1959 2 Sheets-Sheet 1
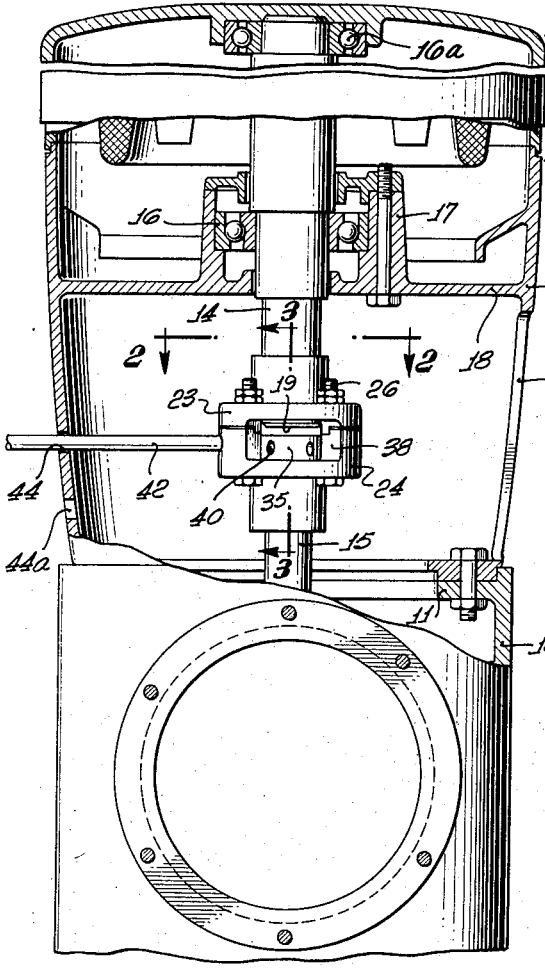
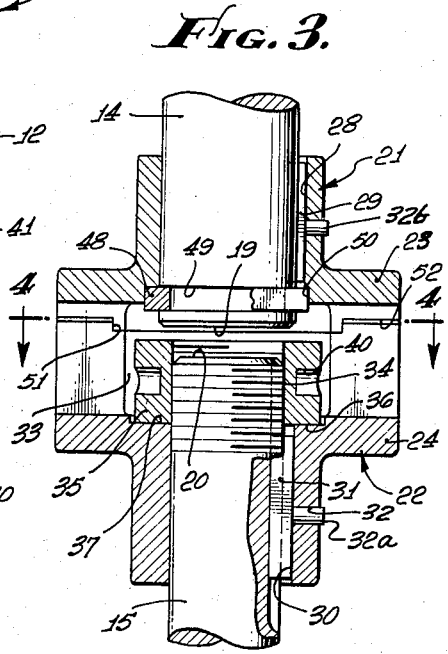
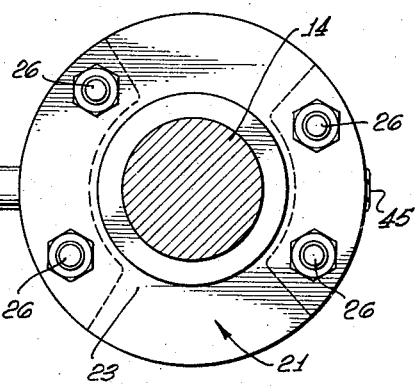
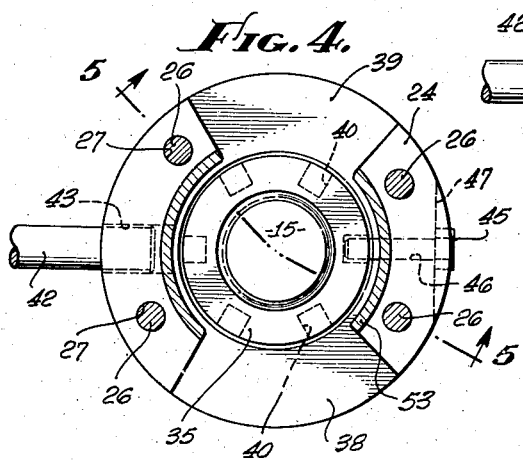
INVENTOR.
ALBERT J. GAREY
BY
Flam and Flam
ATTORNEYS.

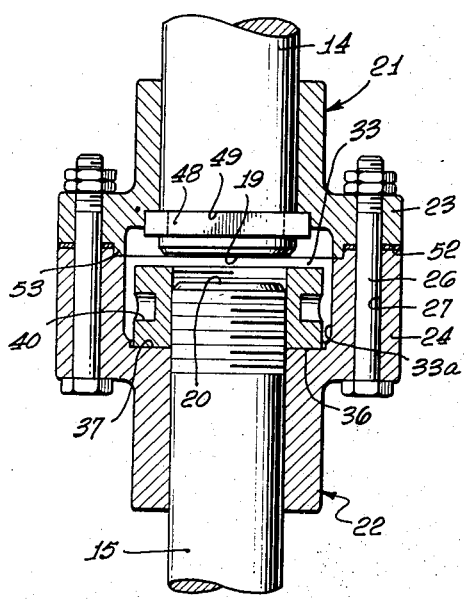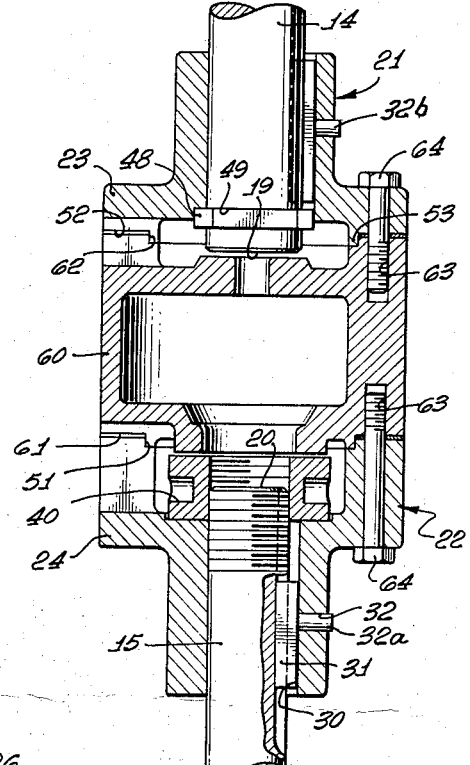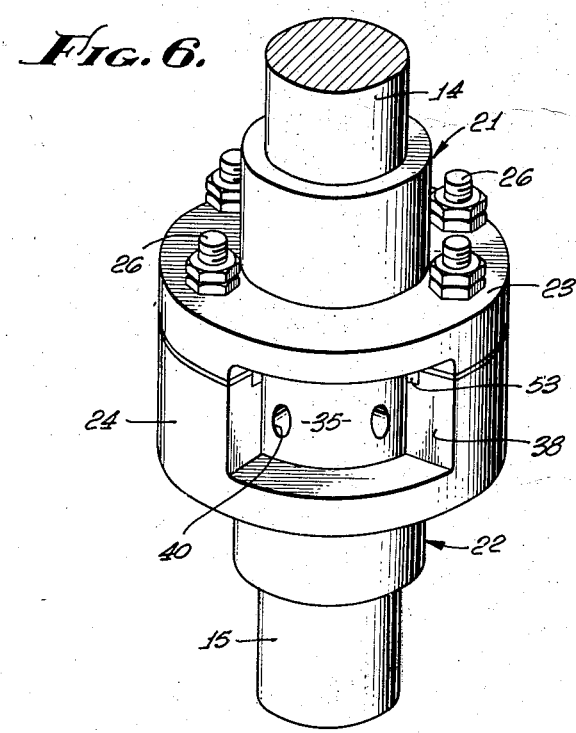

United States Patent Office 2,953,403
Patented Sept. 20, 1960

2,953,403

ADJUSTABLE DRIVE COUPLING FOR PUMP SHAFTS

Albert J. Garey, Los Angeles, Calif., assignor to U.S. Electrical Motors, Inc., Los Angeles, Calif., a corporation of California Filed Jan. 7, 1959, Ser. No. 785,522

3 Claims. (Cl. 287—130)

This invention relates to a vertical motor-pump system, as for water wells, and of the type wherein the motor is mounted at the top of a well casing. Specifically this invention relates to a coupling between the motor shaft and the pump shaft whereby the axial position of the pump runners attached to the pump shaft can be accurately adjusted.

In my prior Patent No. 2,564,838, issued August 21, 1951, there is disclosed and claimed an adjustable coupling structure utilizing mutually telescoping parts carried at the companion ends of the motor and pump shafts, there being a threaded relationship between the parts. A driving pin holds the telescoping parts in adjusted position. This arrangement, although effective to secure adjustment of the pump shaft, suffered some disadvantages. Thus, bearing in mind that shaft whipping can be eliminated only by ensuring a concentric arrangement through the coupling, precise concentricity between the motor and pump shafts depended upon the threads of the coupling elements being concentric with respect to the respective shafts. Concentricity is difficult to achieve for threaded parts, at least without special expensive techniques.

Furthermore, in this prior arrangement, the driving relationship between the coupling parts was necessarily disturbed in order that adjustment be achieved. A drive pin, inferior in operation to a key, was required since a key could not easily be removed.

The primary object of this invention is to overcome the foregoing disadvantages and to provide an adjustable coupling between a depending motor shaft and a pump shaft. This is made possible by a novel coupling structure whereby a simple adjusting nut carried at the upper end of the pump shaft is accessible for adjustment. The rotary coupling per se is undisturbed even though axial adjustment is accomplished. Keys are accordingly used since there is no necessity that they be removed for adjustment purposes. Since there is no screw-threaded arrangement between the coupling members, problems of concentricity are avoided, etc.

Another object of this invention is to provide a device of this sort which comprises relatively simple parts.

Still another object of this invention is to provide a structure of this character in which a simple spacer can readily be inserted whereby seal structures at the pump head can be removed and replaced without requiring removal of the motor.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a fragmentary vertical sectional view of adjacent parts of a motor and a pump structure, and particularly illustrating the companion ends of the motor and pump shafts at which the improved coupling structure is located;

Figs. 2 and 3 are enlarged sectional views, taken along planes indicated by lines 2—2 and 3—3 of Fig. 1;

Fig. 4 is a sectional view, taken along the plane indicated by line 4—4 of Fig. 3;

Fig. 5 is a sectional view, taken along an offset plane indicated by line 5—5 of Fig. 4;

Fig. 7 is similar to Fig. 3, but illustrating the manner in which the coupling parts are usable with an extension; and Fig. 6 is a pictorial view of the improved coupling structure.

In Fig. 1 there is illustrated a pump discharge casting 10 provided with an inwardly directed flange 11 upon which is mounted the lower end bracket 12 of a motor structure 13.

The motor provides a depending shaft 14 adapted to be connected to the upwardly extending shaft 15 of the pump structure beneath the casting 10. The shaft 14 is supported by the aid of a thrust bearing structure 16 which in turn rests within a cup 17 formed upon a wall 18 of the bracket 12. The shaft 15 passes outwardly of the flow passage within the discharge casting 10 and an appropriate seal (not shown) is provided.

As shown in Fig. 3, the shafts 14 and 15 have ends 19 and 20 spaced vertically from each other. The shafts 14 and 15 are connected by the aid of companion coupling members 21 and 22 which bridge the gap between the shafts. Both coupling members 21 and 22 are formed substantially as collars telescoping over the ends of the shafts. Both members 21 and 22 have radial flange portions 23 and 24 (see also Fig. 5) respectively adapted to be secured to each other by the aid of tie bolts 26, whereby the connection is effected. A series of angularly spaced, aligned through openings 27 in the flanges 23 and 24 of the respective coupling members 21 and 22 are provided for passage of the tie bolts 26.

The upper coupling member 21 and the shaft 14 together form a keyway 28 in which a key 29 is accommodated for connecting the upper coupling member 21 and shaft 14. Similarly, the lower coupling member 22 and the pump shaft 15 together define a keyway 30 in which a key 31 is accommodated. The key 31 is held against longitudinal movement relative to the coupling member 22 by the aid of an integral pin or projection 32a extending into a radial aperture 32 intersecting the bottom of the keyway 30. The projection 32a exerts no radial force on the shaft which might tend to affect the shaft alignment. The key 29 carries a like projection 32b. When the motor is operated, a driving force is transmitted through the motor shaft 14, key 29, upper coupling member 21, tie bolts 26, lower coupling member 22, key 31 and the pump shaft 15.

The coupling members 21 and 22 provide at their mating portions a central cavity 33 within which the ends of the shafts 14 and 15 are located. A substantial portion of the cavity 33 is formed by a recess 33a of the pump shaft mounted coupling member 22. The cavity 33, as illustrated in Fig. 5, lies entirely within, and is circumscribed by, the series of tie bolts 26.

The pump shaft 15 is threaded at its upper ends, as at 34, for cooperation with an adjusting nut 35 mounted thereon. The nut 35 is located within the recess 33a (Fig. 5), the depth of the recess 33a exceeding the thickness of the nut 35. The lower surface 36 of this adjusting nut 35 rests upon the lower annular end wall 37 of the recess 33a. Adjustment of the nut 35 along the threads 34 serves to elevate or lower the shaft 15 relative to the coupling member 22, the weight of the pump runner and shaft 15 maintaining the nut 35 against the surface 37 during such adjustment.

Adjustment of the nut 35 is made possible even though the coupling members 21 and 22 are maintained in operative position. For this purpose, and as illustrated in Figs. 4 and 6, the flanges 23 and 24 of the coupling members 21 and 22 are interrupted to provide two access openings 38 and 39 which extend into the recess 33a. The access openings divide the flanges into two axially uninterrupted parts at which two tie bolts 26 each are accommodated.

The adjusting nut 35 has a series of outwardly opening, angularly spaced sockets or recesses 40 whereby the nut 35 can be rotated. As illustrated clearly in Fig. 4, the angular extent of either of the access openings 38 and 39 is greater than the inclusive span of adjacent recesses 40. It is accordingly possible to move the nut 35 angularly relative to the lower coupling member 22 by repeated insertion into a successive socket, etc. This operation may be accomplished by passage of a bar through an opening 41 in the lower bracket 12 of the motor 13, the opening 41 being at the same level as the coupling structure.

In order to prevent angular movement of the nut 35 from merely rotating the shafts 14 and 15 as a unit, a locking or reaction bar 42 (Figs. 1 and 4) is used. The bar 42 is removably accommodated in a socket 43 formed peripherally of the radial flange 24 of the lower coupling member 22. The socket 43, as shown in Fig. 4, is located between the access openings 38 and 39 and between two tie bolts 26. The bar 42 passes through an aperture 44 in that side of the motor bracket 12 remote from the access opening 41. Once the bar 42 is positioned, the motor frame or bracket structure 12 absorbs the reaction, whereby the adjusting nut 35 may be turned without rotation of the shafts 14 and 15.

When the shaft 15 is adjusted appropriately for suitable operation of the pump runners, the nut 35 is locked in position on shaft 15. As shown in Fig. 4, this is achieved by a screw 45 which projects into the cavity 33 via a threaded opening 46 in the flange 24 of the lower coupling member 22. This aperture 46 is located opposite the reaction bar socket 43 and similarly between the remaining two tie bolts 26. Threaded insertion of the screw 45 into the aperture 46 upon appropriate alignment of one of the sockets 40 of the nut 35 causes the end of the screw 45 to enter one of the sockets 40. The nut 35 is locked relative to the coupling member 22, and since the coupling member 22 is keyed to the shaft 15, the nut 35 holds the shaft 15 in adjusted position.

The head of the screw 45 engages a flat 47 formed on the periphery of the flange 24. In this manner, excessive projection of the head of the screw 45 is avoided, and at the same time a good bearing area is provided against which the head of the screw can be tightened.

A two-part annular key 48 (Figs. 3 and 5) transfers the load of the shaft 15 and the hydraulic down thrust of the pump to the thrust bearing 16 of the motor 13. Thus, the edges about the lower end of the bore of the coupling member 21 bear downwardly upon the key 48, and the key 48 in turn bears downwardly on the shaft 14. For this purpose, the key 48 fits within a groove 49 formed at the end of the motor shaft 14, and it is confined therein by an annular recess 50 formed as an enlargement at the end of the coupling member bore, the recess circumscribing a substantial portion of the key 48.

The thrust is transferred to the threads 34 at the upper end of the pump shaft 15, thence to nut 35, lower coupling member 22, tie bolts 26, upper coupling member 21, key 48 to shaft 14.

In addition to down thrust, there are many applications where the pump impellers supported by shaft 15 develop an upward thrust of magnitude approximating one-third of the down thrust load. This up thrust is normally of an intermittent nature, but unless provisions are provided to restrict or limit the upward movement of shaft 15, serious damage is inflicted upon the pump.

To restrict this movement, the motor shaft 14 is in the path of upward movement of the adjusting nut 35, here being only slight clearance between these parts. To ensure this relationship, the inner diameter of the adjusting nut is smaller than the outside diameter of the shaft 14. A desirable clearance is determined and achieved by appropriate dimensions of parts. Since the nut 35 does not change its normal axial position relative to the coupling members despite adjustment of the shaft 15, the clearance is maintained constant. Thus, the up thrust is not limited by engagement with the end of the shaft 15, which is accordingly recessed within the upper end of the nut at all times. The up thrust is ultimately absorbed by the upper bearing 16a of the motor structure.

The lower coupling member 22 has at its upper end an annular step 51 interrupted by the openings 38 and 39. An annular projection 53 of the upper coupling member 21, and similarly interrupted by the openings 38 and 39, adjoins the inner portion of the end shoulder 52 (see Fig. 5) of this coupling member. The projection 53 and step 51 interfit each other to provide alignment. Concentricity of the coupling members 21 and 22 and the shafts 14 and 15 is accordingly maintained independently of the tie bolts 26.

The coupling members 21 and 22 are desirably dynamically balanced in order to minimize whipping of the shaft structures. To ensure that, once disassembled, the coupling members 21 and 22 will be placed in their original position, the coupling structure is non-symmetrical about any axial plane. For this purpose, the spacing between the holes 27 for the two tie bolts 26 on one side of the openings 38 and 39 is greater than the spacing between the bores 27 for the tie bolts 26 at the other side. Hence, it will be impossible to connect the coupling members 21 and 22 by the aid of the tie bolts in any other manner.

In some instances, the seal between the pump head and the shaft 15 requires removal or replacement. To make this possible without disturbing the motor or driving member 21, a spacer structure illustrated in Fig. 7 is provided. A spacer 60 serves as a detachable extension of the flange 24 of the lower coupling member 22. Thus, it provides an annular shoulder 61 fitting the step 51 of the lower coupling member 22. At its upper end it provides a step 62 equivalent to the step 51 of the lower coupling member 22 for cooperation with the shoulder 52 and projections 53 of the upper coupling member 21. The spacer 60 provides threaded apertures 63 for cap screws 64 provided in place of the tie bolts 26.

The lower inner portion of the extensions 60 serves as a substitute for the motor shaft 14 in limiting upward movement of the pump shaft 15.

The seal parts may be made accessible by the following operation: the cap screws 64 are removed and the coupling members 21 and 22 are slightly separated to permit removal of the spacer 60. Thereupon, the lower coupling member 22 and the nut 35 are removed through the space previously occupied by the spacer 60. The seal parts are slipped over the end of the shaft 15, and outwardly between the spaced ends of the shafts 14 and 15.

A second hole 44a in the motor bracket (Fig. 1) allows for the alternate vertical location of the reaction bar socket 43 when the spacer 60 is used.

The inventor claims:

1. In combination with a pair of aligned coaxial shafts: coupling sleeves having opposed faces and carried respectively by the shafts; at least one of the shafts being axially movable with respect to its sleeve; means joining the sleeves to provide a drive between the shafts; one of said sleeves defining a recess that is accessible from the exterior of the sleeves; a nut located in the recess and engaging a threaded end of one of the shafts for adjusting the axial position of the said one shaft; said nut having provisions for the reception of a tool extending into the recess for exerting a turning force on the nut; and means removably cooperable with one of the sleeves for restraining movement of the said one shaft during adjustment of said nut.

2. In combination with a pair of aligned coaxial shafts: coupling sleeves having opposed faces and carried respectively by the shafts; at least one of the shafts being axially movable with respect to its sleeve; means joining the sleeves to provide a drive between the shafts; one of said sleeves defining a recess that is acessible from the exterior of the sleeves; a nut located in the recess and engaging a threaded end of one of the shafts for adjusting the axial position of the said one shaft; said nut having provisions for the reception of a tool extending into the recess for exerting a turning force on the nut; and a removable spacer between the sleeves.

3. In combination: a motor shaft; a pump shaft; coupling sleeves carried respectively by the shafts; the pump shaft being axially movable with respect to its sleeve; means joining the sleeves to provide a drive between the shafts; a nut carried at the upper end of said pump shaft and serving to adjustably limit axial movement of the pump shaft in one direction with respect to its sleeve; and a removable spacer between the sleeves and having an axial dimension sufficient to permit removal of the pump shaft mounted sleeve and said nut without removal of said motor shaft, said spacer having means engageable with the nut and clearing the pump shaft for limiting movement of the pump shaft in the opposite direction.

References Cited in the file of this patent

UNITED STATES PATENTS

| | | |
|---|---|---|
| 1,373,712 | Budlong | Apr. 5, 1921 |
| 1,522,980 | Roco et al. | Jan. 13, 1925 |
| 1,962,229 | Adams | June 12, 1934 |
| 2,086,806 | Hollander | July 13, 1937 |
| 2,108,679 | Kurti | Feb. 15, 1938 |
| 2,210,811 | Kelpsch | Aug. 6, 1940 |
| 2,564,838 | Garey | Aug. 21, 1951 |
| 2,830,801 | Stratienko | Apr. 15, 1958 |